Figure 1:
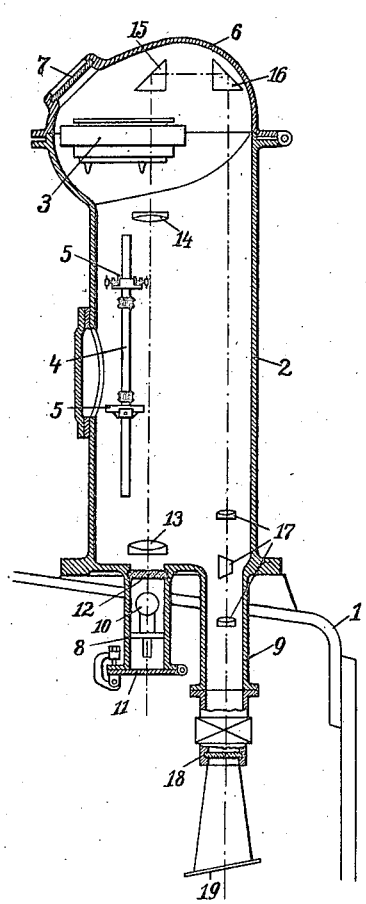

May 29, 1923.                                                    1,456,679
M. ROUX
ILLUMINATING DEVICE FOR USE IN CONNECTION WITH MAGNETIC COMPASSES
OF SUBMARINE VESSELS
Filed Jan. 28, 1921

Inventor:

Patented May 29, 1923.

1,456,679

UNITED STATES PATENT OFFICE.

MAX ROUX, OF BERLIN, GERMANY.

ILLUMINATING DEVICE FOR USE IN CONNECTION WITH MAGNETIC COMPASSES OF SUBMARINE VESSELS.

Application filed January 28, 1921. Serial No. 440,732.

(GRANTED UNDER THE PROVISIONS OF THE ACT OF MARCH 3, 1921, 41 STAT. L., 1313.)

*To all whom it may concern:*

Be it known that I, MAX ROUX, a citizen of the German Republic, and resident of Berlin, Germany, have invented a certain new and useful Improved Illuminating Device for Use in Connection with Magnetic Compasses of Submarine Vessels, for which I have obtained patents in Germany, No. 304,286, dated May 24th, 1917; Sweden, No. 47,805, dated Jan. 30th, 1919; Norway, No. 30,696, dated Febr. 19th, 1919; France, No. 517,864, dated Febr. 17th, 1919; Great Britain, No. 147,032, dated July 6th, 1920; Japan, filed Sept. 4th, 1920, Ser. No. 60,395, and of which the following is a specification.

It is, with magnetic compasses, known to employ a transparent, compass card which may be perforated and to illuminate this card from the one side, whereby it is made possible to ascertain the position of the card also from the other side. It is also known to arrange a source of light, for instance an electric lamp, above the compass and to throw the light down through the transparent or perforated card upon a certain plane or surface located at a certain distance below the compass. Furthermore it is known to arrange the source of light below the compass and to direct the rays from above the compass to various places by means of lenses and the like. In all these cases the source of light and the observer are on opposite sides of the compass.

None of these known constructions is suited for submarine vessels having the magnetic compass located in a special casing which extends upwards from the body of the vessel and has a sight-hole through which the compass may be viewed when the vessel is not submerged. The object in general is to see the compass also from the interior of the vessel when this is submerged, but in particular the object of the present invention is to so arrange the source of light that access can be had to it from the interior of the vessel in its submerged state. This is extremely important for the vessel and its crew. In cases of emergency the life of the whole may, in fact, depend upon the immediate substitution of a new lamp for a damaged one, or, in other words, upon the possibility of doing that. There is no such possibility if the lamp is located in the top of the narrow casing containing the compass, viz, if the vessel is submerged. This is the point: accessibility of the lamp also if the vessel is submerged.

I attain that object by providing two ways for the rays of light, the one leading from the interior of the vessel up into the casing containing the compass, the other back from that casing into the interior of the vessel; the compass, or its card respectively, is inserted into one of those ways, and prisms arranged above the compass change twice the direction of the rays so as to transfer these latter from the one way into the other. At the commencement of the one way, within the vessel, the source of light is fixed; at the end of the other way, also within the vessel, is the sight opening through which the picture of the compass card may be inspected. This latter may be located in one or in the other way. Owing to the source of light, or the electric incandescence lamp respectively, being located in the interior of the vessel, it is, of course, accessible also if the vessel is submerged; thus, it may, in case of need, be at once replaced by another lamp if that just used should fail. This is, repeatedly said, of utmost importance for the safety of the vessel with its crew, and the invention is, thus, of high value particularly for submarine vessels for which it has especially been constructed.

Figure 2:
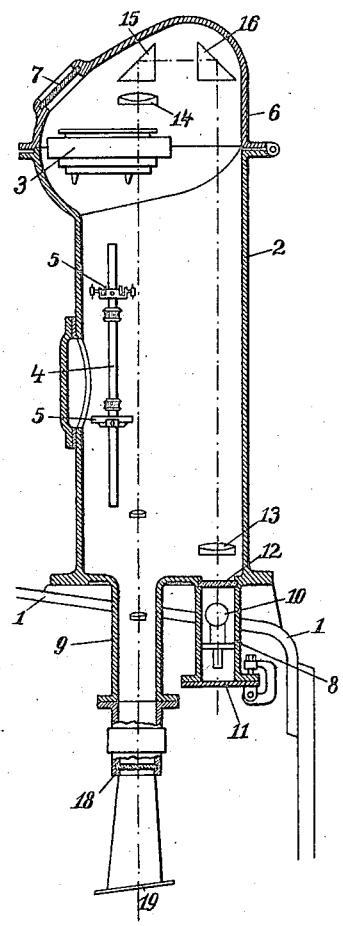

In order to make my invention more clear, I refer to the accompanying drawing in which two forms of construction of the invention are shown by way of example. Figure 1 is a vertical section through one of them, Figure 2 is a vertical section through the other of them; similar numbers of reference denote similar parts in the two illustrations.

Referring to Figure 1, 1 indicates a portion of the body of the vessel, and 2 is the upright casing, in the top of which the magnetic compass 3 is arranged. The casing 2 consists, of course, not of magnetic material. It must be borne in mind that the compass is arranged outside of the steel body of the vessel just to obviate the hurtful influence of this body upon the compass needle. I wish it, however, to be understood that the casing 2 may be located also upon the socalled tower of the submarine vessel.

The compass has a perforated or transparent card of any known construction. Below it may be a compensating device also of known construction, consisting, for instance, of a compensating rod 4 and of compensating magnets 5, as shown. The compass may be inspected from above, when the vessel is not submerged, through a glass plate 7 provided in the cover 6 of the casing 2. The cover contains also prisms 15 and 16, of which 15 is located over the compass, whereas the other has its place laterally from the first, as shown.

The interior of the casing is connected with the interior of the vessel by means of two branches 8 and 9, of which 8 contains a source of light 10, especialy an electric incandescence lamp, which is enclosed between a lower end plate 11 and an upper glass plate 12. Instead of a simple glass plate a lens or a system of lenses may be used. Between this plate or lens or system of lenses 12 and the compass 3 are two lens-systems 13 and 14 forming together a condenser. These systems of lenses are preferably so computed and so arranged relatively to one another that parallel rays pass from 13 to 14, so that the relatively great distance between 13 and 14 is immaterial.

The casing proper of the compass has, of course, suitable apertures for the passage of the rays. These now illuminate a certain portion of the card which then is projected down into the vessel with aid of the prisms 15 and 16 and of a set of lenses and a prism 17 whereby the picture of that card portion is thrown down through the branch 9 and through a glass plate 18 upon a plate 19 where it may be viewed and the position of the compass may be ascertained.

Figure 2 differs from Figure 1 merely by the change of position of the branches 8 and 9 with their contents and by the lens-system 14 being arranged not below the compass, but above it, or between it and the prism 15 respectively, the lens-system 13 lying again above the branch 8. Also in this case the rays may pass in parallel direction from 13 to 14, only not directly, but through the prisms 16 and 15, i. e. in opposite direction. The rose image is projected downwards through the branch 9.

It is not indispensably requisite to make use of two branches of comparatively small diameter; also one of comparatively large diameter will do, but also in this case it is necessary to separate the interior of the vessel from the interior of the casing 2 by thick glass-plates, such as 12 and 18, in order to prevent the moist air contained within the vessel from finding access into the casing and making the lenses etc. dim with moisture.

The plate 19 may be transparent or not. If the compass card image is to be viewed from above, the plate 19 need not be transparent, but may merely be a simple white plate. If, however, the picture is to be seen from the lower side of 19, then 19 must be a screen.

The principal point of the whole arrangement and combination of parts described is this that the source of light, or the lamp 10 respectively, can instantaneously be attended to if anything happens with it, even and especially when the vessel is submerged. This is the point by which the novel arrangement excels all known ones employed in connection with submarine vessels.

Having now described my invention, what I desire to secure by a patent of the United States is:

1. In a submarine vessel having a hollow structure extending upwards from the body of the vessel and having a compass with a transparent card in the top of said structure, the combination, with said vessel-body, said structure, said compass and said card, of a branch forming an additional member of the said hollow structure and extending from it down into the vessel body; a source of light located in said branch; means arranged within the hollow structure on a level above that of the compass and being adapted to reverse the direction of the rays so as to make them return into the body of the vessel on another way; the compass being so arranged as to have its card cross one of said ray ways, for the purpose as described.

2. In a submarine vessel having a hollow structure extending upwards from the body of the vessel and having a compass with a transparent card in the top of said structure, the combination, with said vessel-body, said structure, said compass and said card, of a branch forming an additional member of the said hollow structure and extending from it down into the vessel body; a source of light located in said branch; two prisms arranged within the hollow structure on a level above that of the compass and being adapted to reverse the direction of the rays so as to make them return into the body of the vessel on another way; the compass being so arranged as to have its card cross one of said ray ways, for the purpose as described.

3. In a submarine vessel having a hollow structure extending upwards from the body of the vessel and having a compass with a transparent card in the top of said structure, the combination, with said vessel-body, said structure, said compass and said card, of two branches forming additional members of said structure and connecting it with the vessel; a source of light arranged in one of said branches; means arranged within the hollow structure on a level above that of the compass and being adapted to reverse the direction of the rays so as to make them return into the body of the vessel through the other branch, the compass being so arranged relatively to said means that its card crosses one of said ray ways, for the purpose as described.

4. In a submarine vessel having a hollow structure extending upwards from the body of the vessel and having a compass with a transparent card in the top of said structure, the combination, with said vessel-body, said structure, said compass and said card, of two branches forming additional members of said structure and connecting its interior with the interior of the vessel; glass plates affixed within said branches and separating the interior of the said structure from the interior of the said vessel; a source of light arranged in one of said branches below the glass plate of the same; means arranged within the hollow structure on a level above that of the compass and being adapted to reverse the direction of the rays so as to make them return into the body of the vessel through the glass plate, of the other branch, the compass being so arranged relatively to said means that its card crosses one of said ray-ways, for the purpose as described.

5. In a submarine vessel having a hollow structure extending upwards from the body of the vessel and having a compass with a transparent card in the top of said structure, the combination, with said vessel-body, said structure, said compass and said card, of a source of light located within the vessel and being so arranged relatively to the said hollow structure that its rays can pass upwards into it; a prism arranged above the compass card; another prism arranged laterally from said first prism and from the compass, the two prisms being adapted to reverse the direction of the rays so as to make them return into the body of the vessel on another way; the compass being so arranged relatively to said prisms that its card crosses one of said ray ways, for the purpose as described.

In testimony whereof I have affixed my signature in presence of two witnesses.

MAX ROUX.

Witnesses:
 OTTO E. JACQUES,
 ROSE STAHL.